US006940983B2

(12) United States Patent
Stuart

(10) Patent No.: US 6,940,983 B2
(45) Date of Patent: Sep. 6, 2005

(54) RESONATOR FOR ACTIVE NOISE ATTENUATION SYSTEM

(75) Inventor: Philip Edward Arthur Stuart, Chatham (CA)

(73) Assignee: Siemens VDO Automotive Inc., Chatham (CA)

( * ) Notice: Subject to any disclaimer, the term of this patent is extended or adjusted under 35 U.S.C. 154(b) by 611 days.

(21) Appl. No.: 09/802,592

(22) Filed: Mar. 9, 2001

(65) Prior Publication Data

US 2002/0126853 A1 Sep. 12, 2002

Related U.S. Application Data

(60) Provisional application No. 60/205,731, filed on May 19, 2000.

(51) Int. Cl.[7] ................................................ H04B 29/00

(52) U.S. Cl. ..................................... 381/71.4; 381/71.5

(58) Field of Search .............................. 381/71.1, 71.5, 381/71.4, 71.12; 181/206; 123/184

(56) References Cited

U.S. PATENT DOCUMENTS 4,805,733 A * 2/1989 Kato et al. .................. 181/206
5,176,114 A * 1/1993 Brackett ................ 123/184.42
5,446,790 A * 8/1995 Tanaka et al. ........... 381/71.14
5,828,759 A 10/1998 Everingham
5,850,458 A * 12/1998 Tomisawa et al. ......... 381/71.4
6,084,971 A 7/2000 McLean
6,385,321 B1 * 5/2002 Krueger et al. ............ 381/71.7
6,654,476 B1 * 11/2003 Guenther .................... 381/407

FOREIGN PATENT DOCUMENTS

WO WO00/04532 1/2000

* cited by examiner

*Primary Examiner*—Xu Mei

(57) ABSTRACT

An active noise attenuation system for an air induction assembly is operably connected to an engine that generates a low frequency noise having a noise profile defining a peak noise. The system has an air inlet duct housing with an inlet and an outlet connected to the engine. A resonator is supported by the housing and is positioned between a speaker assembly and the engine to attenuate the peak noise resulting in an attenuated low frequency engine noise. A microphone senses the attenuated low frequency engine noise and generates an attenuated low frequency engine noise signal. A controller receives and phase shifts the signal and sends the signal to the speaker to generate a sound field to cancel or reduce the attenuated low frequency engine noise signal.

18 Claims, 2 Drawing Sheets

RESONATOR FOR ACTIVE NOISE ATTENUATION SYSTEM

RELATED APPLICATION

This application claims priority to provisional application No. 60/205,731 filed on May 19, 2000.

BACKGROUND OF THE INVENTION

1. Field of the Invention

This invention relates to a resonator that works in conjunction with an active noise cancellation module to reduce low frequency engine noises.

2. Related Art

Internal combustion engines include air induction systems for conducting air to engine cylinders. Engine noise is propagated through the air induction systems, which is undesirable. Noise attenuation mechanisms have been installed within the air induction systems to reduce these noises. For this application, this noise attenuation mechanism is referred to as an Active Noise Cancellation (ANC) system and includes a speaker, a microphone, and a signal generator that are mounted within an air inlet duct housing. The microphone detects the noise and generates a noise signal that is sent to the signal generator. The signal generator phase-shifts the signal and sends the signal to the speaker to generate a sound field that cancels out the noise that is being detected by the microphone.

High power requirements and large speaker sizes are required to reduce engine noise levels below accepted values. Typically, engine noise must be reduced below 110 Hertz (Hz). This causes the ANC system to be very large, taking up a considerable amount of packaging space. Additionally, these ANC systems draw a large amount of power from the vehicle electrical system in order to effectively cancel the high levels of low frequency noise.

It is the object of the present invention to provide an ANC system that overcomes the deficiencies outlined above.

SUMMARY OF THE INVENTION

In a disclosed embodiment of this invention, an active noise attenuation system includes an air inlet duct housing having an inlet end into which air is drawn and an outlet end operably connected to an engine. The system also includes a sound detector and a speaker assembly. A resonator is supported by the housing and is positioned between the speaker and the engine. The resonator attenuates a portion of the low frequency noise. A controller receives and phase shifts a noise signal generated by the sound detector that corresponds to the attenuated engine noise. The signal is sent to the speaker to generate a sound field to attenuate the remaining engine noise.

The engine generates low frequency noise that has a noise profile with a peak noise. In a preferred embodiment, the resonator attenuates the peak noise resulting in an attenuated engine noise level. The sound detector senses the attenuated engine noise level and the speaker produces a sound field that cancels or reduces the noise level.

An air filter is installed within the housing behind the speaker to filter out contaminates from the air flowing through the housing. In one embodiment, a resonator is mounted to the filter. The filter is cylindrically shaped with a first end fitting over the resonator and a second end fitting over the outlet end of the housing. In another embodiment, the resonator extends radially outwardly from the housing between the filter and the engine.

The subject apparatus provides an ANC system that significantly reduces low frequency engine noise by utilizing smaller speakers and less vehicle electrical power.

These and other features of the present invention can be best understood from the following specification and drawings, the following of which is a brief description.

DETAILED DESCRIPTION OF AN EXEMPLARY EMBODIMENT

Figure 1:
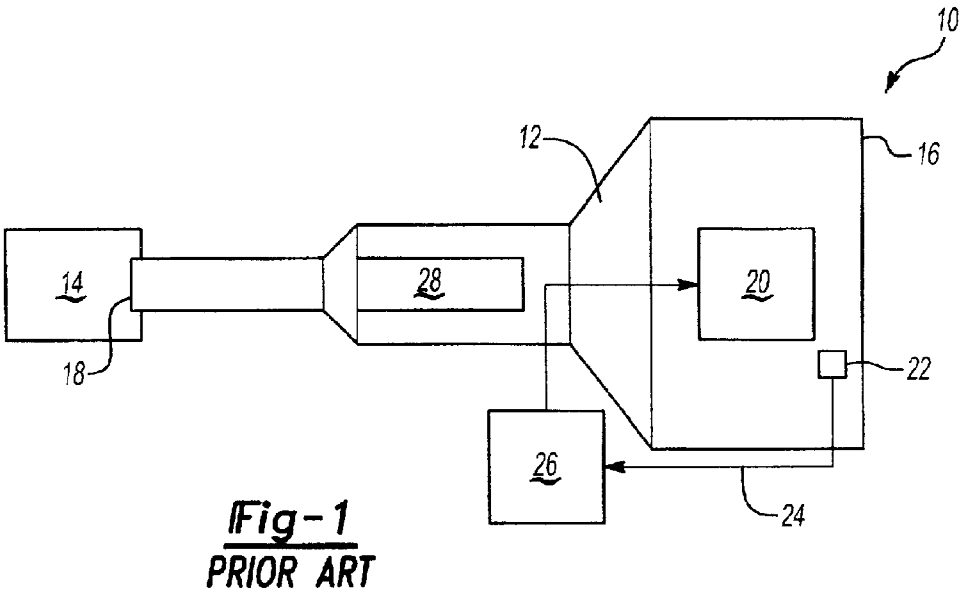
Fig-1 PRIOR ART
FIG. 1 is a schematic diagram of a prior art ANC system.

Referring to the drawings, FIG. 1 shows a known noise attenuation system 10 including an air inlet duct housing 12 forming part of an air induction system for an internal combustion engine 14. The air inlet duct housing 12 has an inlet end 16 and an outlet end 18 that is operably connected to the engine 14. Typically the inlet end 16 is of greater diameter than the outlet end 18.

A speaker assembly 20 is mounted within the air inlet duct housing 12 to face the inlet 16. A sound detector 22, such as a microphone, is mounted in front of the speaker 20 to detect engine noise. The microphone 22 generates a noise signal 24 that corresponds to the detected noise. The signal 24 is sent to a controller, microprocessor, or other similar device 26 where the signal is phase-shifted. Preferably, the signal 24 is phase-shifted 180 degrees and is then sent to the speaker 20. The speaker 20 generates a sound field based on the phase-shifted signal to cancel out the detected engine noise. The operation of the microphone 22, speaker 20, and controller are well known and will not be discussed in detail.

Figure 2:
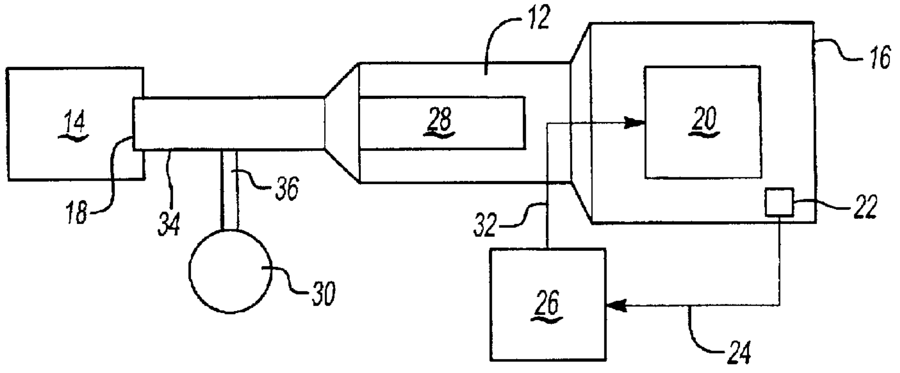
FIG. 2 is a schematic diagram of one embodiment of an ANC system incorporating the subject invention.

An air filter 28 is mounted within the housing 12 between the inlet 16 and outlet 18 for filtering contaminants from the air as it flows through the housing 12. The subject invention utilizes a resonator 30, shown in FIG. 2, that is supported by the housing 12 and is preferably positioned between the speaker 20 and the engine 14 for attenuating engine noise. The engine 14 generates an undesirable low frequency noise that has a noise profile defining a peak noise. The resonator 30 attenuates the peak noise over a predetermined range, resulting in an attenuated low frequency engine noise. The microphone 22 senses the attenuated low frequency engine noise and generates the signal 24, which represents an attenuated low frequency engine noise. As discussed above, the controller 26 receives the attenuated signal 24, phase-shifts the signal 24, and sends a control signal 32 to the speaker to generate a sound field that attenuates or cancels the remaining engine noise.

Any type of resonator 30 known in the art can be used to attenuate the peak engine noise. A resonator 30 is typically a hollow chamber or cavity with dimensions chosen to permit internal resonant oscillation of acoustical waves of specific frequencies. Thus, the size and shape of the resonator 30 will vary depending on the specific application. The size and shape can be change to allow attenuation of predetermined frequencies for different engines.

The resonator 30 can be situated either inside or outside the ANC unit to suit the required packaging of the system. In one embodiment, shown in FIG. 2, the resonator 30 extends radially outward from an external surface 34 of the housing 12. The resonator 30 can be integrally formed with the housing 12 or can be supported on an arm 36. The resonator 30 is preferably positioned on the housing 12 behind the air filter 28.

Figure 3:
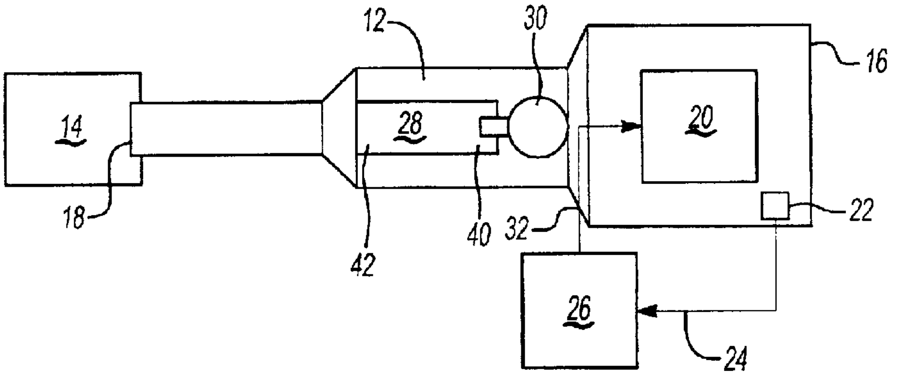
FIG. 3 is a schematic diagram of an alternate embodiment of an ANC system.

In another embodiment, shown in FIG. 3, the resonator 30 is supported by the air filter 28 within the housing 12. The air filter 28 is preferably cylindrical in shape and has a first end 40 that fits over the resonator 30 and a second end 42 that fits over the air outlet 18 to the engine 14. This both connects the resonator 30 into the ANC system and also locates and supports the filter 28. Thus, the filter 28 does not require a fully sealed end, which reduces filter weight and cost.

The design of the resonator 30 is a Helmholtz configuration that permits high attenuation over a narrow noise band. The resonator's amplitude of attenuation does not require it to remove all the noise at the required frequency range, but to reduce the noise such that the ANC unit can then add some small contribution to tailor the noise to the required frequency content.

Figure 4:
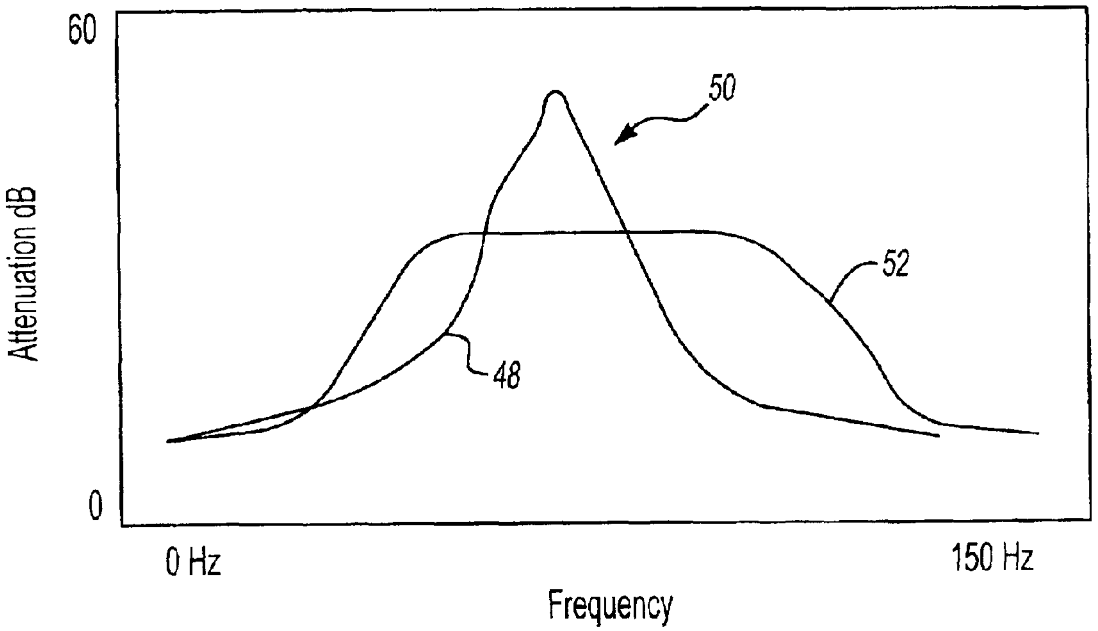
FIG. 4 is a graph of Attenuation dB versus Frequency.

An Attenuation decibel (dB) versus Frequency Hertz (Hz) for a preferred embodiment of the resonator 30 is shown in FIG. 4. The engine noise has a profile 48 that has a peak range of noise indicated generally at 50. The resonator 30 is tuned to attenuate this peak range of noise 50. Typically, the resonator 30 is tuned to attenuate within the range of 60–90 Hz, resulting in an attenuated profile 52. This allows the size of the ANC speaker 20 to be reduced to improve packaging, reduce cost, and reduce amplifier power requirements. Speakers 20 that are less than 400 millimeters in diameter can be used with an ANC system incorporating the subject resonator 30, which can significantly increase packaging space for other vehicle components.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. An active noise attenuation system comprising:

an air inlet duct housing having an inlet end into which air is drawn and an outlet end operably connected to an engine;

a sound detector for sensing noise emanating from said air inlet duct housing and generating a noise signal corresponding to said noise;

a speaker mounted within said air inlet duct housing and facing said inlet end;

a resonator supported by said air inlet duct housing and positioned between said speaker and said engine for reducing low frequency engine noise; and a controller for receiving and phase shifting said noise signal and sending a control signal to said speaker to generate a sound field to attenuate said noise wherein said resonator attenuates a first frequency of engine noise and said speaker, sound detector, and controller cooperate to attenuate a second frequency of engine noise with said second frequency of engine noise being lower than said first frequency of engine noise.

2. A system according to claim 1 wherein said resonator attenuates said low frequency noise resulting in an attenuated engine noise level and said sound detector senses said attenuated engine noise level.

3. A system according to claim 1 wherein said resonator reduces low frequency engine noise within a predetermined range.

4. A system according to claim 3 wherein said speaker is less than four hundred millimeters in diameter.

5. A system according to claim 1 including an air filter for filtering contaminants from the air, said air filter being positioned behind said speaker.

6. A system according to claim 5 wherein said resonator is mounted to said air filter.

7. A system according to claim 5 wherein said resonator extends outwardly from said air inlet duct housing between said air filter and said engine.

8. A system according to claim 5 wherein said air filter is substantially enclosed by said air inlet duct housing.

9. A system according to claim 8 wherein said resonator includes a resonator structure defining a hollow resonator chamber, said resonator structure being supported by said air inlet duct housing between said speaker and said outlet end.

10. An active noise attenuation system comprising:

an air inlet duct housing having an inlet end into which air is drawn and an outlet end operably connected to an engine;

a sound detector for sensing noise emanating from said air inlet duct housing and generating a noise signal corresponding to said noise;

a speaker mounted within said air inlet duct housing and facing said inlet end;

an air filter for filtering contaminants from the air, said filter being positioned behind said speaker;

a resonator supported by said housing and mounted to said air filter wherein said resonator is positioned between said speaker and said engine for reducing low frequency engine noise and wherein said air filter is cylindrically shaped with a first end fitting over said resonator and a second end fitting over said outlet end; and a controller for receiving and phase shifting said noise signal and sending a control signal to said speaker to generate a sound field to attenuate said noise.

11. An active noise attenuation system comprising:

an engine for generating low frequency noise having a profile defining a peak noise;

an air inlet duct housing having an inlet into which air is drawn and an outlet operably connected to said engine;

a speaker mounted within said air inlet duct housing and facing said inlet;

an air filter mounted within said air inlet duct housing between said inlet and outlet for filtering contaminants from the air;

a resonator supported by said air inlet duct housing and positioned between said speaker and said engine for attenuating said peak noise resulting in an attenuated low frequency engine noise wherein said resonator is supported directly by said air filter within said air inlet duct housing;

a sound detector for sensing said attenuated low frequency engine noise and generating an attenuated low frequency engine noise signal; and a controller for receiving and phase shifting said attenuated low frequency engine noise signal and sending a control signal to said speaker to generate a sound field to attenuate said attenuated low frequency engine noise signal.

12. A system according to claim 11 wherein said resonator attenuates said peak noise within a predetermined range.

13. A system according to claim 12 wherein said speaker is less than four hundred millimeters in diameter.

14. A system according to claim 12 wherein said resonator extends radially outward from said housing between said air filter and said engine.

15. An active noise attenuation system comprising:

an engine for generating low frequency noise having a profile defining a peak noise;

an air inlet duct housing having an inlet into which air is drawn and an outlet operably connected to said engine;

a speaker mounted within said air inlet duct housing and facing said inlet;

an air filter mounted within said air inlet duct housing between said inlet and outlet for filtering contaminants from the air;

a resonator supported by said air inlet duct housing and positioned between said speaker and said engine for attenuating said peak noise within a predetermined range resulting in an attenuated low frequency engine noise wherein said air filter is cylindrically shaped with a first end fitting over said resonator and a second end fitting over said outlet;

a sound detector for sensing said attenuated low frequency engine noise and generating an attenuated low frequency engine noise signal; and a controller for receiving and phase shifting said attenuated low frequency engine noise signal and sending a control signal to said speaker to generate a sound field to attenuate said attenuated low frequency engine noise signal.

16. An active noise attenuation system comprising:

an air inlet duct housing having an inlet end into which air is drawn and an outlet end operably connected to an engine;

a sound detector for sensing noise emanating from said air inlet duct and generating a noise signal corresponding to said noise;

a speaker mounted within said air inlet duct housing and facing said inlet end;

an air filter for filtering contaminants from the air, said air filter being positioned behind said speaker and wherein said air filter is substantially enclosed by said air inlet duct housing;

a resonator supported by said air inlet duct housing and positioned between said speaker and said engine for reducing low frequency engine noise wherein said resonator is supported directly by said air filter within said air inlet duct housing; and a controller for receiving and phase shifting said noise signal and sending a control signal to said speaker to generate a sound field to attenuate said noise.

17. An active noise attenuation system comprising:

an engine for generating low frequency noise having a profile defining a peak noise;

an air inlet duct housing having an inlet into which air is drawn and an outlet operably connected to said engine;

a speaker mounted within said air inlet duct housing and facing said inlet;

an air filter mounted within said air inlet duct housing between said inlet and outlet for filtering contaminants from the air;

a resonator supported by said air inlet duct housing and positioned between said speaker and said engine for attenuating said peak noise resulting in an attenuated low frequency engine noise;

a sound detector for sensing said attenuated low frequency noise and generating an attenuated low frequency engine noise signal wherein said speaker comprises a single speaker with said sound detector being positioned between said speaker and said inlet and wherein said resonator and said air filter are positioned between said speaker and said outlet; and a controller for receiving and phase shifting said attenuated low frequency engine noise signal and sending a control signal to said speaker to generate a sound field to attenuate said attenuated low frequency engine noise signal.

18. A system according to claim 17 wherein said air filter is enclosed within said air inlet duct housing.

* * * * *